United States Patent Office 3,535,732
Patented Oct. 27, 1970

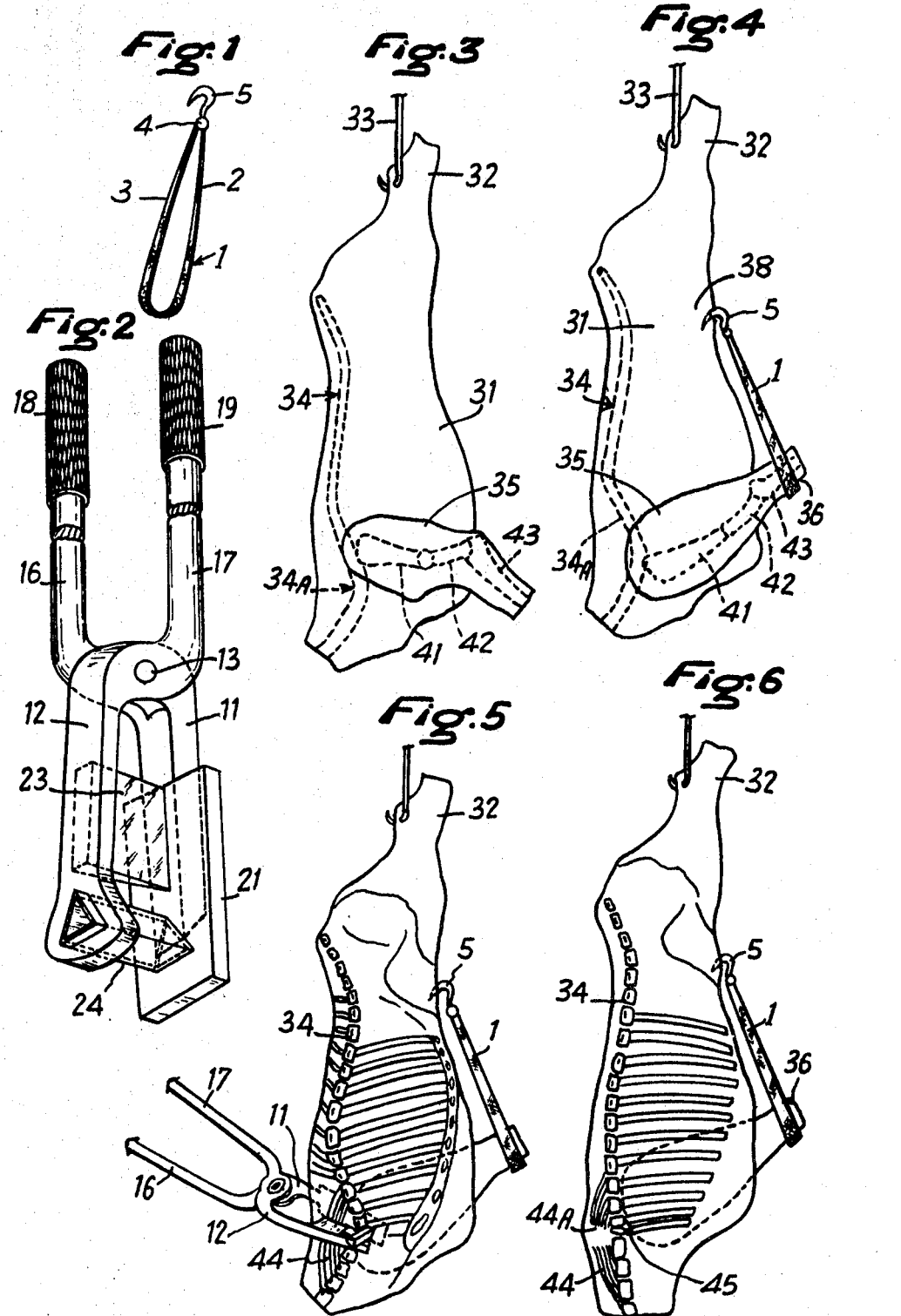

3,535,732
METHOD OF AND APPARATUS FOR PREPARING SIDES OF MEAT FOR BONING ON AN AUTOMATIC MACHINE
Georges Aubert, Marseille, France, assignor to N. Schlumberger & Cie, Paris, France
Original application July 25, 1967, Ser. No. 655,952, now Patent No. 3,483,592, dated Dec. 16, 1969. Divided and this application Mar. 5, 1969, Ser. No. 816,469
Claims priority, application France, July 29, 1966, 21,530
Int. Cl. A22b 3/10
U.S. Cl. 17—1       3 Claims

ABSTRACT OF THE DISCLOSURE

To prepare a side of meat for boning on an automatic machine a pincers member having a cutting blade and a notching wedge is used for severing the nerves of the neck and notching the spinal column to give the side of meat a standard special configuration.

This is a division of application Ser. No. 655,952, filed on July 25, 1967, now Pat. No. 3,483,592, issued Dec. 16, 1969.

The method of the invention comprises suspending the side of meat by the hind leg raising the foreleg towards the hind leg and keeping it so raised, and of severing the nerves of the neck and notching the spinal column at a level with the collar, on the side of the point of the brisket or caparison while the side is still warm.

The invention relates to a device intended to give sides of meat, i.e. the half of the animal, a standard rational configuration whereby they can be functionally arranged on a special machine for automatically boning the meat, an operation which is practically impossible to carry out if the sides of meat have not first been given this standard special configuration.

In accordance with the invention the side of meat is suspended by the hind leg raising the foreleg towards the hind leg and keeping it so raised, and the device is used for severing the nerves of the neck and notching the spinal column at a level with the collar, on the side of the point of the brisket or caparison while the side is still warm.

Thanks to the cutting action of this device the side, under the effect of its own weight, assumes a general configuration in which the spinal column is substantially rectilinear, a configuration which is particularly favourable to subsequent automatic boning of the meat. Moreover, the bones of the shoulder and of the foreleg also assume a substantially rectilinear general configuration which is equally favourable to subsequent automatic boning.

In a preferred mode of operation the foreleg is kept raised towards the hind leg by means of a halter which is hooked to the point of the quarter called the flank.

The device embodying the invention comprises pincers for severing the nerve of the neck and for notching the spinal column, the tool being formed by two jaws which are movable with regard to each other so as to be able to approach each other and draw apart from each other, the facing surfaces of the said jaws being equipped, one with a shoulder and the other with a blade having a cutting edge and with a notching wedge, the edges of the blade and of the wedge coming to bear against the said shoulder when the pincers are closed.

The invention will be better understood by reading the description which will follow and by examining the attached drawings which show, by way of example, apparatus for putting the method of the invention into practice and which also show the different stages of this method.

In these drawings:
FIG. 1 shows a halter used to keep the foreleg in the raised position;
FIG. 2 shows pincers for severing the nerve of the neck and for notching the spinal column; and
FIGS. 3 to 6 show different stages of the method.

The halter shown in FIG. 1 is composed of a flexible strap 1 formed, for example, by a strip of leather or other appropriate material, this strap being in the shape of a loop, the two sides 2 and 3 of which have their extremities connected and firmly fixed one to the other, for example in a ferrule 4 which is integral with a pointed hook 5.

The pincers shown in FIG. 2 comprise two jaws 11, 12 which are movable with regard to one another so as to be able to draw away from each other and to approach each other. In the example shown these two jaws are articulated on a common shaft 13 and have extensions 16 and 17 respectively, forming manipulating limb terminating in handles 18, 19.

The part of the jaw 11 which faces the other jaw 12 has a shoulder 21 which, in this example, is flat and composed of a plate built onto the jaw 11.

The surface of the jaw 12 which faces the shoulder 21 of the jaw 11 carries a cutting blade 23 and notching wedge 24. The notching wedge 24, is of triangular section, and acts as a punch, i.e. it is hollow with a view to punching the spinal column in the shape of a V, in such a way that the two branches of the V can reunite, which allows the spinal column to straighten by its own weight.

The triangular shape of this punch is preferable to the circular shape of a conventional punch, as tests have shown that the spinal column and the collar hold up better once stiffened, at the time of boning, when the cut of the spinal column is straight and clean.

The edge of the cutting blade 23 bears against the shoulder 21 of the other limb when the pincers are closed. In the same way, the edge of the wedge 24 also bears against the shoulder 21 when the pincers are closed.

To use this apparatus one proceeds in the following manner:

A side of meat 31 which is to be prepared is suspended by the hind leg 32, for example from a hook 33. The spinal column, designated as a whole by 34, presents in the neighbourhood of the shoulder 35 a curvilinear part 34A, the curvature of which is relatively very pronounced.

The first stage of the operation consists of raising the foreleg 36 and of keeping it raised by means of the halter 1 shown on FIG. 1, the hook 5 of which is planted at the point 38 of the side 31 called the flank. The length of the halter 1 is such that the shoulder and the foreleg 36 assume substantially the position shown on FIG. 4, in which the bones 41, 42, 43 are arranged in a straight line, as a continuation one of the other.

By means of the pincers shown on FIG. 2 the nerve of the neck 44 is then severed and a notch, such as 45 (see more especially FIG. 6), is made in the spinal column 34, at a place which is on a level with the collar. This notch, thanks to the shape of the wedge 24 of the pincers, appears in the shape of a V open towards the point of the brisket or caparison of the quarter.

FIG. 5 shows the way of placing the pincers for severing the nerve of the neck and notching the spinal column, whilst FIG. 6 shows the nerve 44 severed as indicated at 44A and the spinal column 34 notched as indicated at 45. Because the side of meat is still warm, which is an indispensable condition forming part of the method, the whole of the mass, under the effect of its own weight, assumes a general vertical configuration which is rectilinear, more particularly as for as the spinal column 34 is concerned. This shape will be preserved when quarters cut from the side have been chilled and will allow subsquent boning on an automatic machine.

It will also be noted that the part formed by the shoulder 35 and the foreleg 36 also forms a whole of a general configuration which is substantially rectilinear, which is especially favourable to subsequent automatic boning.

The severance of the nerve of the neck and the notching of the spinal column are effected, for cattle at the height of the breastbone and of the fore ribs, and for sheep and other animals at the corresponding place.

The pincers shown and described are hand pincers, but one could obviously use pincers which are driven mechanically, electrically or pneumatically for example.

The invention is, of course, not restricted to the modes of operation and tools described and shown. Modifications can be made thereto, without however departing from the scope of the invention.

What I claim is:

1. A device for preparing a side of meat for boning on an automatic machine comprising pincers means for severing the nerve in the neck and for notching the spinal column in a side of meat, said pincers means comprising a first jaw, a second jaw, and means for pivotally connecting said first and second jaws so that they can be moved toward and away from one another, said first and second jaws extending longitudinally from said means for connecting them together, said first jaw having a first end adjacent said means for pivotally connecting said jaws and a second end remote in the longitudinal direction from said means for pivotally connecting said jaws together, a cutting blade and a notching wedge secured to and extending from said first jaw toward said second jaw with said blade and notching wedge disposed in longitudinal alignment on said first jaw with said blade being located closer to the first end of said first jaw and said wedge located closer to the second end thereof, said second jaw having a plate-like shoulder secured thereto with a flat surface thereon facing toward said blade and wedge, the cutting edge of said cutting blade being rectilinear and extending in longitudinal direction of said first jaw, said notching wedge having a triangular shaped end at its end remote from said first jaw and said triangular shaped end having two sides extending in diverging relationship from an apex located adjacent said cutting blade toward the second end of said jaw and the third side of said end interconnecting said two sides extending transversely of the longitudinal direction of said first jaw, said cutting edge of said blade and said triangular end of said wedge simultaneously contacting said flat surface of said second jaw when said jaws are pivoted toward one another so that said blade cuts the nerves in the neck and said notching wedge punches a triangularly shaped opening in the spinal column of the side of meat.

2. A device, as set forth in claim 1, wherein said triangularly shaped end of said notching wedge is hollow and the opening formed therein is triangularly shaped being defined by said sides forming said triangularly shaped end.

3. A device, as set forth in claim 1, wherein a handle is secured to each of said first and second jaws for moving said jaws toward and away from one another.

References Cited

UNITED STATES PATENTS

| 311,121 | 1/1885 | Hair | 30—363 |
| 584,925 | 6/1897 | Cooke | 30—359 |
| 2,145,210 | 1/1939 | Chason | 30—363 |

LUCIE H. LAUDENSLAGER, Primary Examiner

U.S. Cl. X.R.

30—363